United States Patent
Chan et al.

(10) Patent No.: US 7,470,321 B2
(45) Date of Patent: Dec. 30, 2008

(54) CEMENTING COMPOSITIONS AND APPLICATION THEREOF TO CEMENTING OIL WELLS OR THE LIKE

(75) Inventors: Keng Seng Chan, Kuala Lumpur (MY); Youssef Elmarsafawi, Al-Khobar (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 313 days.

(21) Appl. No.: 11/343,121

(22) Filed: Jan. 30, 2006

(65) Prior Publication Data

US 2006/0169179 A1  Aug. 3, 2006

(51) Int. Cl.
C04B 7/14 (2006.01)
(52) U.S. Cl. .................... 106/714; 106/737; 106/738
(58) Field of Classification Search ............. 106/737, 106/714, 738
See application file for complete search history.

(56) References Cited

U.S. PATENT DOCUMENTS

| | | | |
|---|---|---|---|
| 4,680,279 A | * | 7/1987 | Kleeb ................. 501/124 |
| 4,761,183 A | | 8/1988 | Clarke et al. |
| 4,981,731 A | * | 1/1991 | Yorita et al. ............ 427/426 |
| 5,578,538 A | * | 11/1996 | Nishikawa et al. ......... 501/124 |
| 5,858,900 A | * | 1/1999 | Azizian et al. ............ 501/131 |
| 6,911,078 B2 | * | 6/2005 | Barlet-Gouedard et al. . 106/692 |
| 2004/0211341 A1 | | 10/2004 | Barlet-Gouedard |

FOREIGN PATENT DOCUMENTS

EP  0748782  12/1996

OTHER PUBLICATIONS

Derwent abstract-2 pages total KR 342390 B (Jul. 4, 2002) Kim et al. abstract only.*

* cited by examiner

*Primary Examiner*—Paul Marcantoni
(74) *Attorney, Agent, or Firm*—David Cate; Robin Nava; Dale Gaudier

(57) ABSTRACT

The invention relates to composition particularly suitable for squeeze cementing operations at temperature above 160° C. This composition comprises an aqueous base, a liquid set-retarder and a solid phase including a blend of micro fine alumina, micro fine silica and a micro fine cementitious material.

8 Claims, 3 Drawing Sheets

CEMENTING COMPOSITIONS AND APPLICATION THEREOF TO CEMENTING OIL WELLS OR THE LIKE The present invention relates to techniques for drilling oil, gas, water and geothermal wells or the like. More precisely, the invention relates to cementing compositions and their application to cementing operations known as squeezing operations in such wells.

In the art of well cementing, squeeze cementing is defined as the process of forcing a cement slurry, under pressure, through holes or splits in the casing/wellbore annular space. For an overview of the standard procedures for carrying out such process and basic considerations used to design a cement slurry for that purpose, see Well Cementing, Erik B. Nelson (Editor), Chapter 13, pages 13-1 to 13-28, Elsevier Science Publishing Company, Inc., 1990.

Squeeze cementing has many applications including repairing a deficient primary cementing operation, protecting against fluid migration for instance eliminating water intrusion or reduction the gas-to-oil ratio, repairing casing leaks due to damaged pipes, placing a cement plug to abandon nonproductive or depleted zones or to redirect the injection in an injection well and sealing off lost-circulation zones.

In view of this large range of applications, it is understandable that the range of bottomhole temperature at which the cement is exposed during setting varies also broadly. However most commercial cement designs have been formulated for medium range temperature. For instance, the squeeze cementing slurries known from U.S. Pat. No. 6,312,515, and proposing to apply to squeeze formulations the concept of selecting specific grades of particle sizes for the solid fraction of the slurry, can be used between about 5° C. and about 60° C. Improved formulations known from U.S. Pat. No. 6,656,266 have been developed that include a three-dimensional vinyl alcohol type polymer, a nanolatex and an anionic surfactant and that increase that upper temperature limit up to about 160° C., but this compositions are still ill-suited for wells with temperatures exceeding about 180° C.

It should further be noted that since squeeze operations mostly aim at curing narrow cracks, micro-cements with enhanced penetration properties are often preferred to conventional cements. However, since micro-cements have larger specific areas, they usually tend to be more reactive, which in turn does not favor their use at higher temperatures.

Hence a need for cement slurries for squeeze applications adapted to high temperature wells, in particular to wells with temperatures exceeding 180° C.

The present invention aims to provide novel compositions for squeeze cements, in particular for cementing operations in oil, gas, water and geothermal wells or the like, which have a good ability to penetrate into fissures and which can be used at temperatures greater than about 160° C.

This aim is achieved by cementing compositions which comprise an aqueous phase, a micro-cement, and an additive essentially constituted by an aqueous suspension comprising a liquid set-retarder and a solid phase including a blend of micro-fine alumina, micro-fine silica and micro-fine cementitious material.

In a preferred embodiment of the invention, the cementitious material is a mixture of Portland cement and slag, with the slag accounting for at least 60% by weight of cementitious material, and preferably for at least 80% by weight.

In yet a preferred embodiment, the solid blend includes (by volume) 50 to 70% of this cementitious material, 10 to 30% of silica and 10 to 30% of alumina.

The following examples illustrate the invention and furnish advantageous details and characteristics thereof, without limiting its scope. The rheological measurements were carried out after 20 minutes conditioning at the temperature of the measurement, using a Chan 35 rotary viscometer with an outer rotating cylinder, in accordance with API standards, Specification 10, Appendix H. The other measurements were also carried out at the same temperature. The fluid loss tests were carried out using filter paper above the standard screen in accordance with the API standard in the case of the micro-cements.

CHEMICAL AND PHYSICAL ANALYSIS OF MATERIAL USED

Micro Fine Silica

Figure 1:
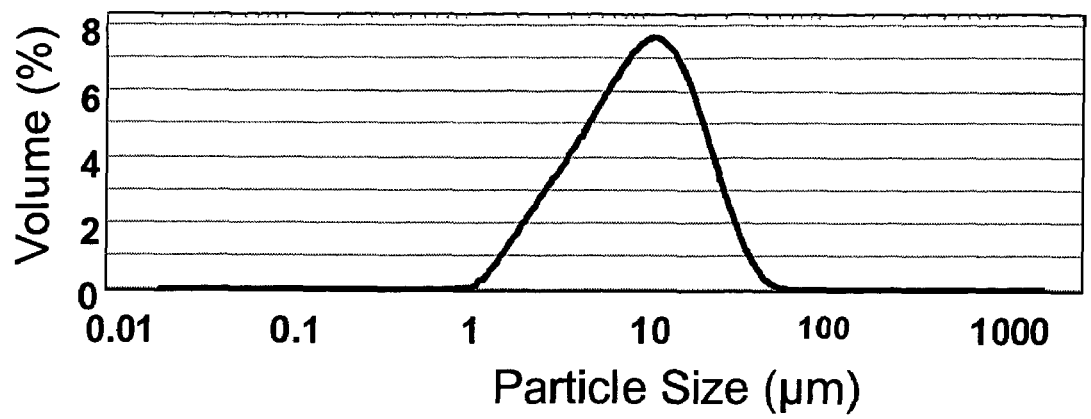
FIG. 1 represents a particle size distribution of a preferred type of micro fine silica suitable for the invention.

The particle size distribution of a preferred type of micro fine silica suitable for the invention is shown in FIG. 1. It can be seen that the particle size ranges from about 1 µm to about 60 µm, with a median size of about 10 µm, as measured using a Mastersizer 2000 (Malvern Instruments Ltd).

By X-ray diffraction, it was checked that the particle was essentially pure silica.

Micro Fine Alumina

Figure 2:
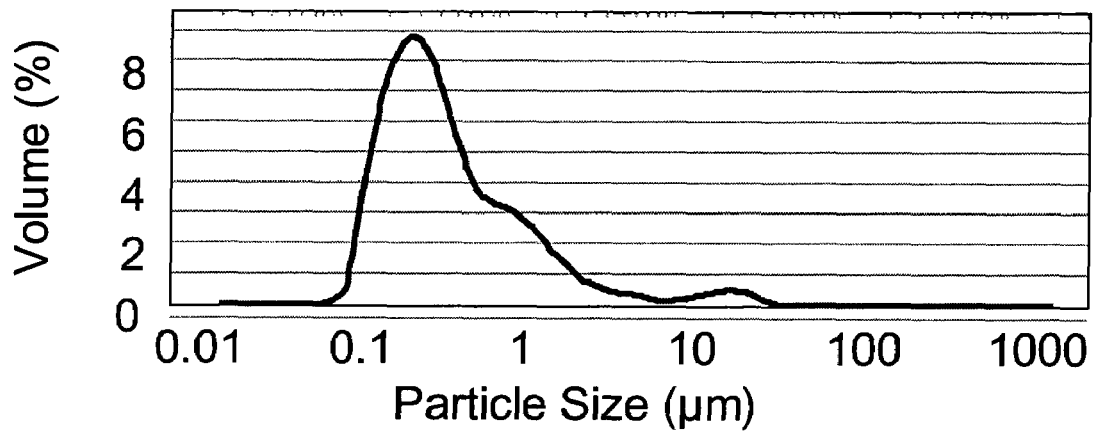
FIG. 2 represents a particle size distribution of a preferred type of micro fine alumina suitable for the invention.

The particle size distribution of a preferred type of micro fine alumina suitable for the invention is shown in FIG. 2: the particle size ranges from about 0.1 µm to about 10 µm, with a median size of about 0.34 µm, as measured using a Mastersizer 2000 (Malvern Instruments Ltd).

By X-ray diffraction, it was checked that the particle was essentially pure corundum $Al_2O_3$.

Micro Fine Cementitious Material

The micro fine cementitious material used according to a preferred embodiment is disclosed in various prior U.S. Pat. Nos. including Clark U.S. Pat. No. 4,761,183, which is drawn to slag, as defined herein, and mixtures thereof with Portland cement, and Sawyer U.S. Pat. No. 4,160,674, which is drawn to Portland cement. The cementitious materials preferred for use in this invention are Portland cement and combinations thereof with slag wherein the quantity of Portland cement included in any mixture of Portland cement and slag used in the methods of this invention can be as low as 10 percent but preferably not greater than about 40 percent, more preferably about 20 percent by weight of mixture.

Figure 3:
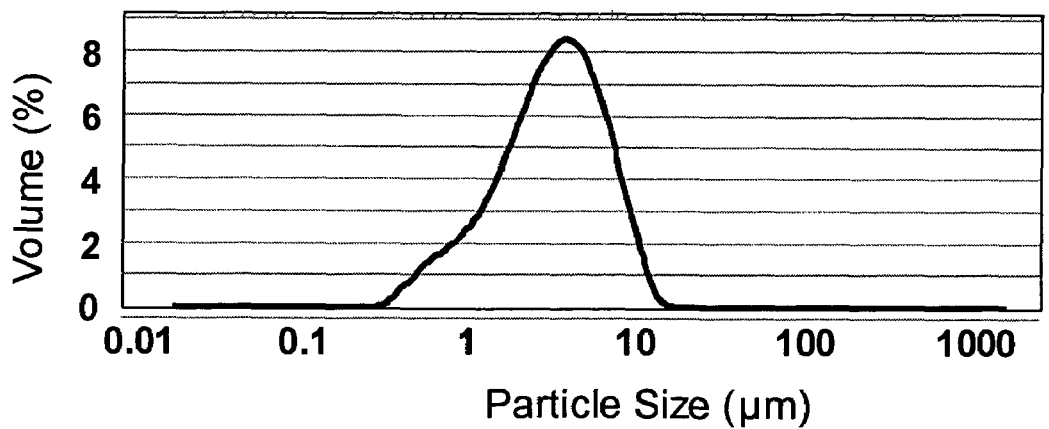
FIG. 3 represents a particle size distribution of a preferred type of micro fine cementitious material suitable for the invention.

The particle size distribution of a preferred type of micro fine cementitious material suitable for the invention is shown in FIG. 3. It can be seen that the particle size ranges from about 0.4 µm to about 20 µm, with a median size of about 3.8 µm, as measured using a Mastersizer 2000 (Malvern Instruments Ltd).

Physical Properties

The color and the specific gravity of the materials are listed in table 1:

TABLE 1

|  | Color | Density (g/cm3) |
|---|---|---|
| Cementitious material | Gray | 2.95 |
| Micro-silica | White to Tan | 2.65 |
| Micro Alumina | White | 4.1 |

Slurry and Set Cement Properties

A cement slurry was designed with a selection of additives and their concentrations optimized to obtain at the same time, a fluid easy to mix, easy to pump (good rheology) and with low fluid loss. With that goal in mind, a styrene-butadiene copolymer in a stabilized aqueous solution, in a grade suitable for high temperature, was used as fluid loss control agent. Other additives include a dispersing agent based on polynapthalene sulfonate, a high-temperature retarder based on an aqueous blend of lignin amine and sodium salt of organic acid and an antifoam based on polysiloxanes, Table 2 is showing the typical concentration and slurry density for optimum results. In this table BVOB stands for by volume of blend, PPG for pounds per U.S. gallon (10 ppg corresponding to 0.119 g/cm$^3$) and GPSB for U.S. gallon per sack of blend; by analogy to conventional cement packaging, a sack has a mass of 84 pounds (in other words, a concentration of 1 GPSB corresponds to the addition of 0.099 liter per kg of blend and a conversion factor of 0.1 was used in the table for the metric data given in brackets)

TABLE 2

|  | Products | Unit | Concentration |
|---|---|---|---|
| Solid Blend | Cementitious material | BVOB | 60 |
|  | Silica | BVOB | 20 |
|  | Alumina | BVOB | 20 |
| Liquid additives | Fluid loss control agent | GPSB | 3.0 (0.3) |
|  | Dispersant | GPSB | 0.25 (0.025) |
|  | Retarder | GPSB | 0.25 (0.025) |
|  | Antifoam | GPSB | 0.25 (0.005) |
| Mix water | Fresh water | GPSB | 2.22 (0.222) |
| Slurry density |  | PPG | 15.5 (1.86) |
| Slurry porosity |  |  | 60% |

Table 3 depicts the mixing rheology, at room temperature and at a temperature of 350° F. (177° C.), as well as the rheology, fluid loss performance and setting properties at a BHCT (bottomhole circulation temperature) at 350° F.

|  | Room Temperature | 350° F. |
|---|---|---|
| API Rheology at BHCT: |  |  |
| Plastic Viscosity (mPa · s) | 106 | 177 |
| Yield Stress (Pa) | 2.7 | 12 |
| Free fluid at BHCT | N/A | 0 |
| API Fluid Loss at BHCT | N/A | 26 |
| Thickening Time at BHCT | N/A | 3:00 |
| Compressive Strength at BHCT: | N/A |  |
| Compressive at 30 hours (psi) |  | 1000 |
| Compressive at 90 hours (psi) |  | 1400 |

Figure 4:
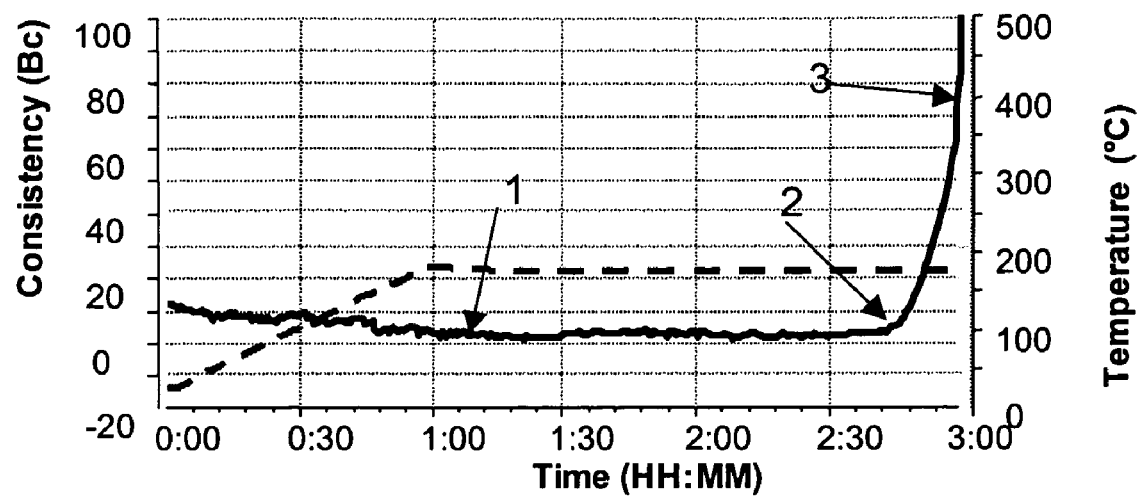
FIG. 4 represents the thickening time chart of the cement slurry at 350° F. (177° C.).

FIG. 4 represents the thickening time chart of the cement slurry at 350° F. (177° C.). There is a period of about two and half hours during which the consistency is low and remains essentially stable (1), then there is a sharp increase (2) with a short setting transition time (from 40 BC to 100 BC) in about 10 minutes, resulting in what is typically considered a good setting profile for oil cementing purpose.

Figure 5:
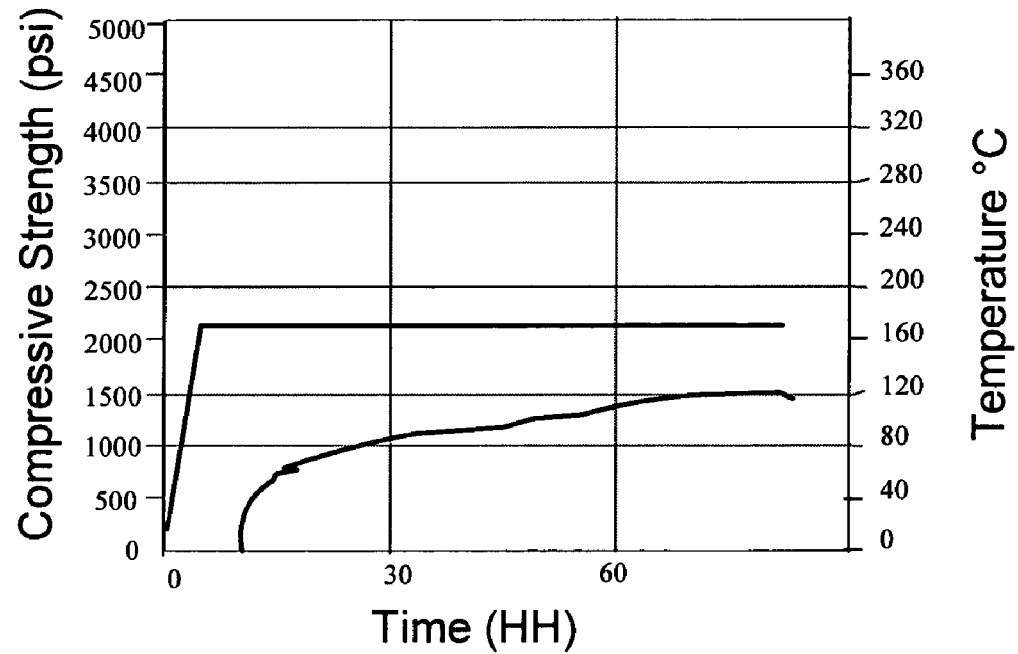
FIG. 5 represents the compressive strength of the system at 177° C.

FIG. 5 represents the compressive strength of the system at 177° C. The compressive shows continuous increase over four days time.

Figure 6:
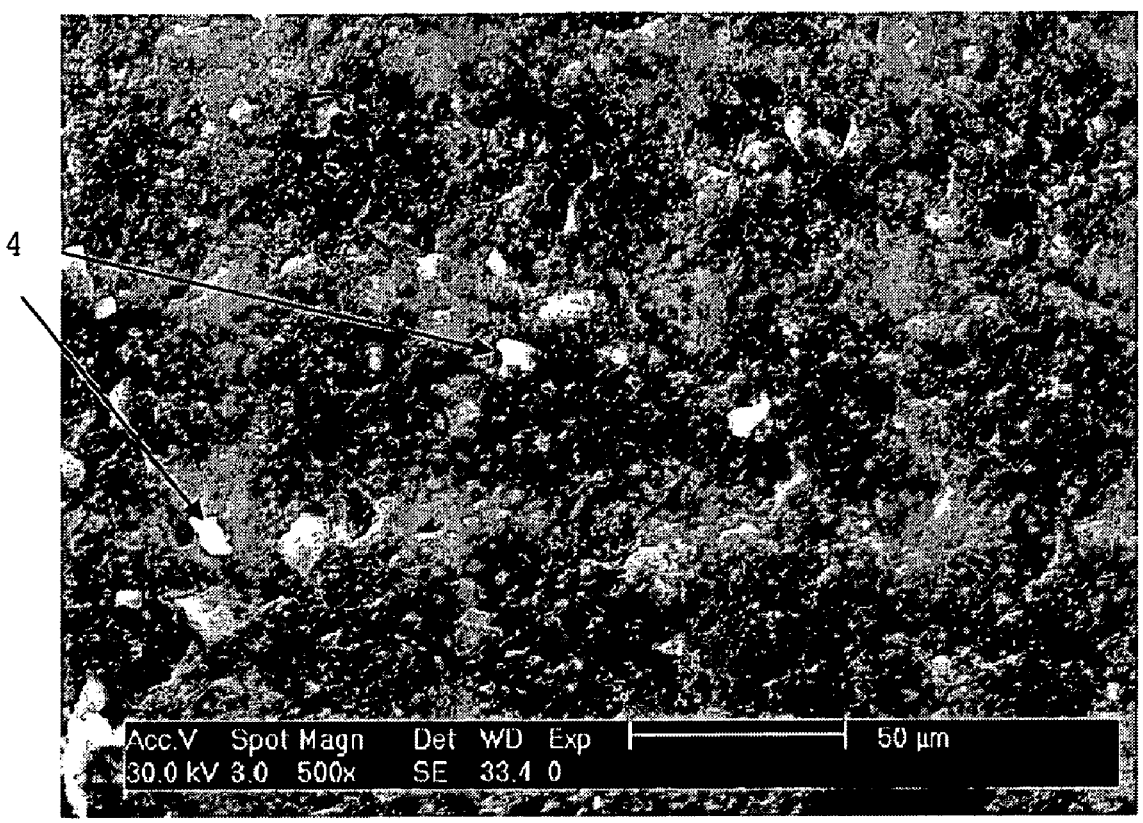
FIG. 6 represents an SEM micrograph of the sample.

The SEM micrograph of the sample, represented in FIG. 6, shows a solid surface with no signs of cracks. The few white spots, showed as pointed to with arrows 4 correspond to free silica.

All of the above tests show that the new system has good set cement stability and cement slurries at high temperature.

The invention claimed is:

1. A cementing composition which is particularly suitable for squeeze cementing operations at temperature above 160° C., comprising an aqueous base, a liquid set-retarder and a solid phase including a blend of micro fine alumina, micro fine silica and a micro fine cementitious material, wherein the cementitious material is a mixture of Portland cement with slag, and wherein the quantity of Portland cement is less than 40% by weight of the mixture.

2. The cementing composition according to claim 1, wherein the cementitious material is a mixture of Portland cement with slag, wherein the quantity of Portland cement is less than 20% by weight of the mixture.

3. The cementing composition according to claim 1, wherein the solid blend includes by volume, 50-70% of micro fine cementitious material, 10-30% of micro fine silica and 10-30% of micro fine alumina.

4. The cementing composition according to claim 3, wherein the solid blend includes by volume, 55-65% of micro fine cementitious material, 15-25% of micro fine silica and 15-25% of micro fine alumina.

5. The cementing composition according to claim 1, wherein the liquid retarder is a blend of lignin amine and sodium heptagluconate.

6. The cementing composition according to claim 1, further including a gas control liquid agent.

7. The cementing composition according to claim 5, wherein said gas control agent is a synthetic latex polymer dispersion.

8. The cementing composition according to claim 1, further including a liquid dispersing agent.

* * * * *